United States Patent
Kuroda et al.

(10) Patent No.: US 12,428,039 B2
(45) Date of Patent: Sep. 30, 2025

(54) TRAVEL CONTROLLER AND TRAVEL CONTROL METHOD

(71) Applicant: TOYOTA JIDOSHA KABUSHIKI KAISHA, Toyota (JP)

(72) Inventors: Ryusuke Kuroda, Tokyo-to (JP); Kenichiro Aoki, Machida (JP); Tadashi Okubo, Machida (JP); Takuya Fujiki, Tokyo-to (JP); Tetsuro Sugiura, Chofu (JP); Kunio Goto, Tokyo-to (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 156 days.

(21) Appl. No.: 18/448,362

(22) Filed: Aug. 11, 2023

(65) Prior Publication Data
US 2024/0067231 A1    Feb. 29, 2024

(30) Foreign Application Priority Data
Aug. 26, 2022 (JP) .................. 2022-135060

(51) Int. Cl.
*B60W 60/00* (2020.01)
*B60W 50/14* (2020.01)

(52) U.S. Cl.
CPC ........ *B60W 60/0053* (2020.02); *B60W 50/14* (2013.01); *B60W 2050/146* (2013.01); *B60W 2420/403* (2013.01); *B60W 2554/4026* (2020.02); *B60W 2554/80* (2020.02)

(58) Field of Classification Search
None
See application file for complete search history.

(56) References Cited

U.S. PATENT DOCUMENTS

| | | | |
|---|---|---|---|
| 8,195,394 B1* | 6/2012 | Zhu | G08G 1/09626 382/107 |
| 10,275,668 B1* | 4/2019 | Nuernberger | G06T 7/30 |
| 2017/0066452 A1* | 3/2017 | Scofield | B60W 60/0059 |
| 2020/0307584 A1 | 10/2020 | Yashiro | |
| 2023/0206767 A1* | 6/2023 | Stenneth | G08G 1/096741 701/26 |

FOREIGN PATENT DOCUMENTS

| | | |
|---|---|---|
| JP | 2019001314 A | 1/2019 |
| JP | 2020160968 A | 10/2020 |

\* cited by examiner

*Primary Examiner* — James J Lee
*Assistant Examiner* — Andrew Sang Kim
(74) *Attorney, Agent, or Firm* — Dickinson Wright, PLLC

(57) ABSTRACT

A travel controller of a vehicle that can travel on a road under autonomous driving control detecting two-wheelers, including bicycles, located in surroundings of the vehicle from surrounding data representing the surroundings of the vehicle generated by a surrounding sensor mounted on the vehicle, determining whether a target road on which the vehicle was traveling when the surrounding data in which a two-wheeler was detected was generated is a shared road on which travel by bicycles is permitted, when it is determined that the target road is a shared road, notifying a driver of the vehicle of a transition demand demanding transition in control of the vehicle from autonomous driving control to manual driving control requiring driving operations by the driver of the vehicle, and when it is determined that the target road is not a shared road, not notifying the driver of the transition demand.

4 Claims, 5 Drawing Sheets

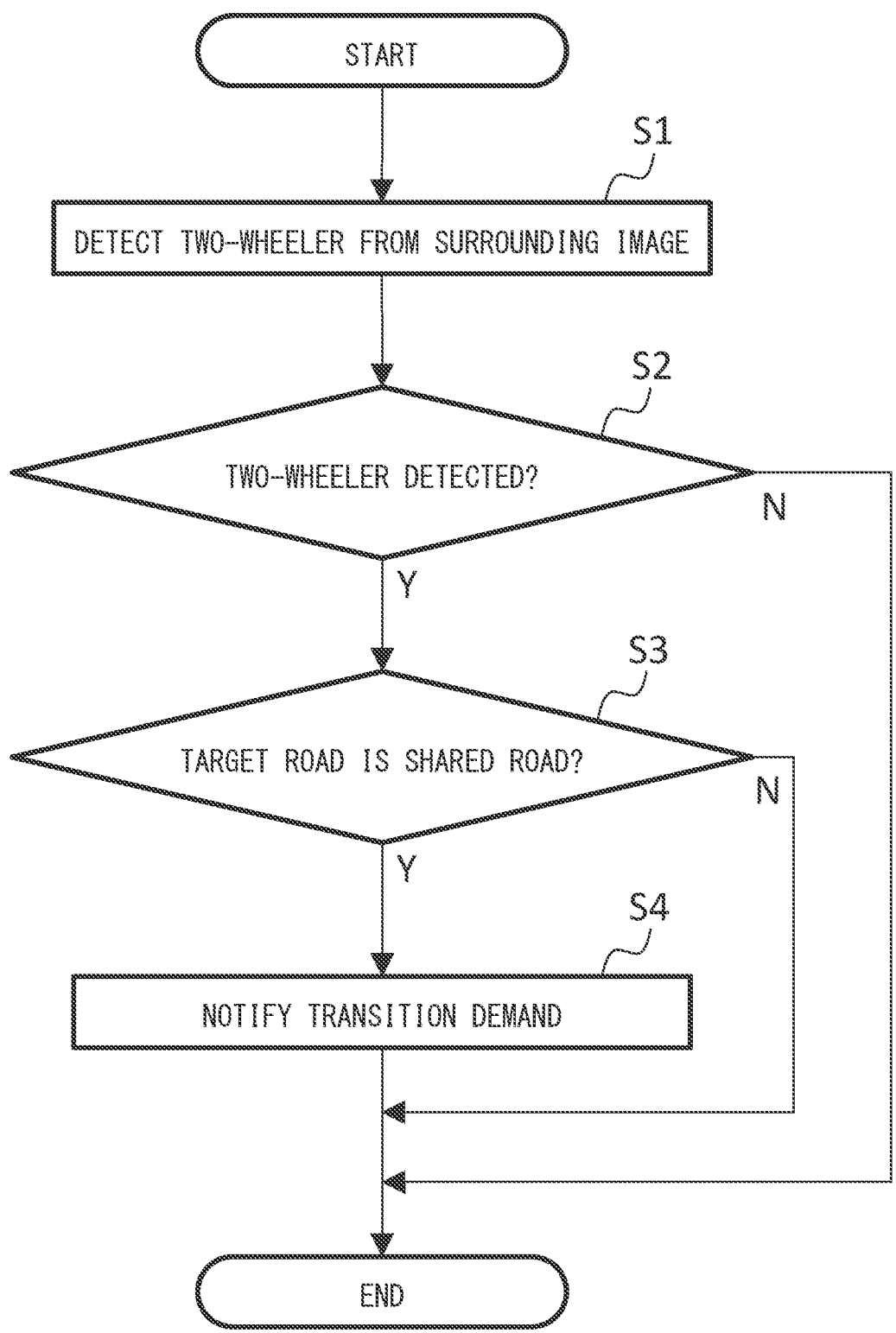

TRAVEL CONTROLLER AND TRAVEL CONTROL METHOD

FIELD

The present disclosure relates to a travel controller and travel control method for controlling travel of a vehicle.

BACKGROUND

Vehicles with two wheels (hereinafter referred to as "two-wheelers") and vehicles other than two-wheelers sometimes travel in a mixed manner on a road. Among two-wheelers, bicycles are slower in speed than others. Therefore, the speed difference between a bicycle and own vehicle will be greater than that between other vehicles including two-wheelers other than bicycles and own vehicle. For this reason, greater care is required in travel control of the vehicle when a bicycle is traveling in the surroundings of own vehicle.

Japanese Unexamined Patent Publication No. 2020-160968 describes a vehicle control device changing a vehicle operation mode from a second operating mode having a predetermined automation rate to a first operating mode having a lower automation rate than that of the second operating mode when recognizing a person, bicycle, or other specific object on a specific area such as a highway.

SUMMARY

Since a bicycle and a two-wheeler other than a bicycle respectively have similar shapes, it is not easy to discriminate between a bicycle and a two-wheeler other than a bicycle when detecting a moving object in the surroundings of a vehicle. If travel of a vehicle is changed from autonomous driving control to manual control every time when a two-wheeler is detected in the surroundings of a vehicle, the vehicle would no longer travel under autonomous control even if the detected two-wheeler were other than a bicycle, and thereby the useability would fall.

It is an object of the present disclosure to provide a travel controller that can suitably change the travel of a vehicle from autonomous driving control to manual driving control when a two-wheeler is detected in the surroundings of the vehicle.

A travel controller according to the present disclosure is a travel controller of a vehicle that can travel on a road under autonomous driving control. The travel controller includes a processor configured to detect two-wheelers, including bicycles, located in the surroundings of the vehicle from surrounding data representing the surroundings of the vehicle generated by a surrounding sensor mounted on the vehicle. The processor of the travel controller is further configured to determine whether a target road on which the vehicle was traveling when the surrounding data in which a two-wheeler was detected was generated is a shared road on which travel by bicycles is permitted. The processor of the travel controller is further configured to, when it is determined that the target road is a shared road notify a driver of the vehicle of a transition demand demanding transition in control of the vehicle from autonomous driving control to manual driving control requiring driving operations by the driver, and when it is determined that the target road is not a shared road not notify the driver of the transition demand.

The processor of the travel controller according to the present disclosure, in the notification, preferably does not notify the driver of the transition demand even if the target road is a shared road, when a two-wheeler located behind the vehicle is detected from the surrounding data and the distance from the vehicle to the two-wheeler increases along with the elapse of time.

The processor of the travel controller according to the present disclosure is preferably further configured to discriminate whether the two-wheeler detected from the surrounding data is a bicycle, and in the notification, does not notify the driver of the transition demand even if the target road is a shared road when the two-wheeler is discriminated as not being a bicycle.

A travel control method according to the present disclosure is a travel control method of a vehicle that can travel on a road under autonomous driving control. The method includes detecting two-wheelers, including bicycles, located in surroundings of the vehicle from surrounding data representing the surroundings of the vehicle generated by a surrounding sensor mounted on the vehicle, determining whether a target road on which the vehicle was traveling when the surrounding data in which a two-wheeler was detected was generated is a shared road on which travel by bicycles is permitted, when it is determined that the target road is a shared road, notifying a driver of the vehicle of a transition demand demanding transition in control of the vehicle from autonomous driving control to manual driving control requiring driving operations by the driver, and when it is determined that the target road is not a shared road, not notifying the driver of the transition demand.

A computer program for travel control stored in a non-transitory computer-readable medium according to the present disclosure causes a computer mounted on a vehicle that can travel on a road under autonomous driving control to execute a process including detecting two-wheelers, including bicycles, located in surroundings of the vehicle from surrounding data representing the surroundings of the vehicle generated by a surrounding sensor mounted on the vehicle, determining whether a target road on which the vehicle was traveling when the surrounding data in which a two-wheeler was detected was generated is a shared road on which travel by bicycles is permitted, when it is determined that the target road is a shared road, notifying a driver of a transition demand demanding transition in control of the vehicle from autonomous driving control to manual driving control requiring driving operations by the driver of the vehicle, and when it is determined that the target road is not a shared road, not notifying the driver of the transition demand.

According to the travel controller of the present disclosure, it is possible to suitably change the travel of a vehicle from autonomous driving control to manual driving control when a two-wheeler is detected in the surroundings of the vehicle.

BRIEF DESCRIPTION OF DRAWINGS

FIG. 6 is a flowchart of travel control processing.

DESCRIPTION OF EMBODIMENTS

A travel controller that suitably changes the travel of a vehicle from autonomous driving control to manual driving control when a two-wheeler is detected in the surroundings of the vehicle will be now described in detail with reference to the attached drawings. The travel controller is mounted on a vehicle that can travel on a road under autonomous driving control. The travel controller detects a two-wheeler located in surroundings of the vehicle from surrounding data representing the surroundings of the vehicle generated by a surrounding sensor mounted on the vehicle. The travel controller determines whether a target road on which the vehicle was traveling when the surrounding data in which the two-wheeler was detected was generated is a shared road on which travel by a bicycle is permitted. When it is determined that the target road is a shared road, the travel controller notifies a driver of the vehicle of a transition demand demanding transition in control of the vehicle from autonomous driving control to manual driving control requiring driving operations by the driver. When it is determined that the target road is not a shared road, the travel controller does not notify the driver of the transition demand.

Figure 1:
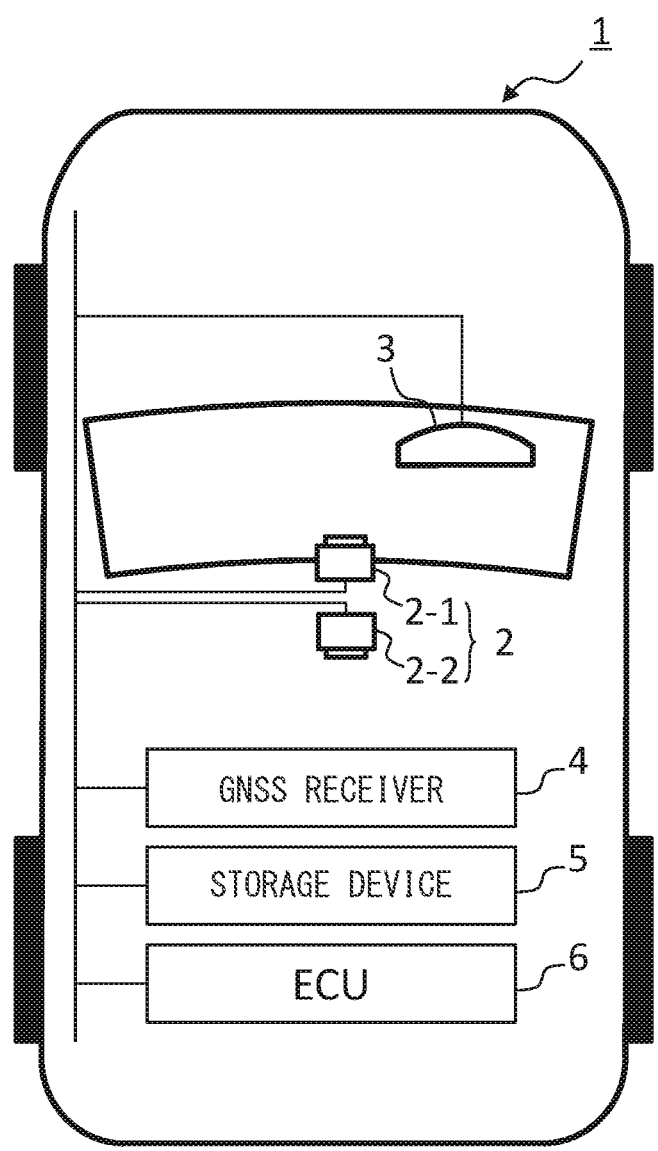
FIG. 1 schematically illustrates the configuration of a vehicle equipped with a travel controller.

FIG. 1 schematically illustrates the configuration of a vehicle equipped with a travel controller.

The vehicle 1 includes a surrounding camera 2, a meter display 3, a global navigation satellite system (GNSS) receiver 4, a storage device 5, and an electronic control unit (ECU) 6. The ECU 6 is an example of the travel controller. The surrounding cameras 2, the meter display 3, the GNSS receiver 4, and the storage device 5 and the ECU 6 are connected via an in-vehicle network conforming to a standard, such as a controller area network, so that they can communicate with each other.

The surrounding camera 2 is an example of surrounding sensor for generating surrounding data representing surroundings of the vehicle 1. The surrounding camera 2 includes a two-dimensional detector constructed from an array of optoelectronic transducers, such as CCD or C-MOS, having sensitivity to visible light and a focusing optical system that forms an image of a target region on the two-dimensional detector. The surrounding camera 2 includes a front surrounding camera 2-1 and back surrounding camera 2-2. The front surrounding camera 2-1 is disposed, for example, in a front and upper area in the interior of the vehicle and oriented forward, while the back surrounding camera 2-2 is disposed in a back and upper area in the interior of the vehicle and oriented backward. The surrounding camera 2 takes pictures of the surroundings of the vehicle 1 through a windshield or rear glass every predetermined capturing period (e.g., 1/30 to 1/10 seconds) and output surrounding images representing the surroundings as surrounding data.

The meter display 3, which is an example of an output device, includes, for example, a liquid crystal display. The meter display 3 displays a message showing a transition demand demanding transition from autonomous control to manual control so as to be visible to the driver in accordance with a signal received from the ECU 6 through the in-vehicle network.

The vehicle 1 may also include, as an output device, a speaker device (not shown) able to output to the driver an audio message or a seat vibrator (not shown) able to output to the driver a tactile message by making the seat vibrate.

The GNSS receiver 4 receives GNSS signals from GNSS satellites at predetermined intervals and determines the position of the vehicle 1 based on the received GNSS signals. The GNSS receiver 4 outputs a positioning signal indicating the result of determination of the position of the vehicle 1 based on the GNSS signals to the ECU 6 via the in-vehicle network at predetermined intervals.

The storage device 5, which is an example of a storage unit, includes, for example, a hard disk drive or a nonvolatile semiconductor memory. The storage device 5 contains map data including information on features, such as lane lines, in association with their positions and traffic regulations information such as the types of vehicles which are permitted to travel on roads.

The ECU 6 autonomously controls at least one of acceleration, deceleration, and steering of the vehicle 1. The ECU 6 also detects a two-wheeler located in the surroundings of the vehicle 1 from the surrounding image which the surrounding camera 2 generates and determines whether the target road which the vehicle 1 had been traveling on when the surrounding image in which a two-wheeler was detected was generated is a shared road. When it is determined that the target road is a shared road, the ECU 6 notifies the driver of the transition demand. When it is determined that the target road is not a shared road, the ECU 6 does not notify the driver of the transition demand.

Figure 2:
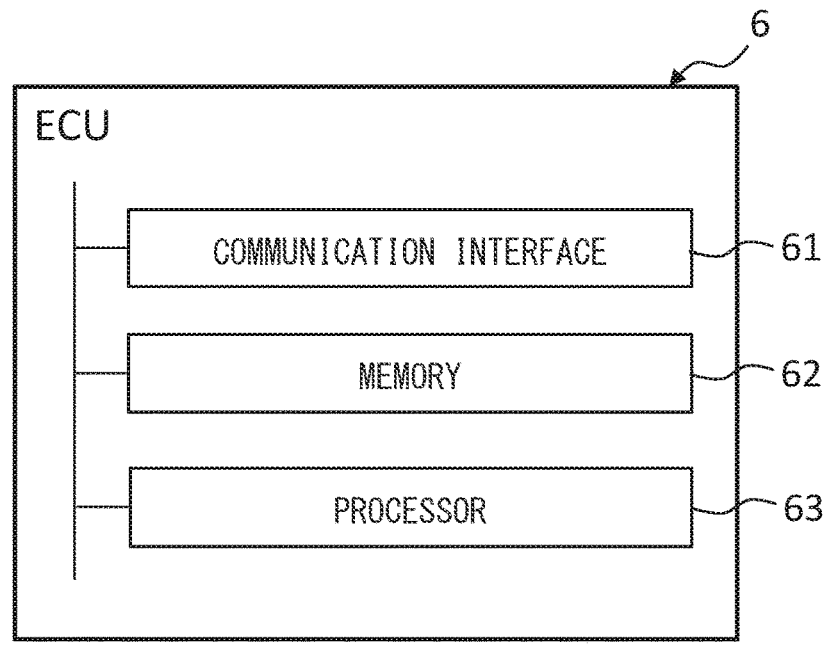
FIG. 2 schematically illustrates the hardware of an ECU.

FIG. 2 schematically illustrates the hardware of an ECU. The ECU 6 includes a communication interface 61, a memory 62, and a processor 63.

The communication interface 61, which is an example of a communication unit, includes a communication interface circuit for connecting the ECU 6 to the in-vehicle network. The communication interface 61 provides received data to the processor 63. Further, the communication interface 61 outputs data provided from the processor 63 to an external device.

The memory 62, which is another example of a storage unit, includes volatile and nonvolatile semiconductor memories. The memory 62 stores various types of data used for processing by the processor 63, e.g., groups of parameters of a neural network used as a classifier for detecting a two-wheeler from a surrounding image (number of layers, layer configuration, kernels, weighting coefficients, etc.) The memory 62 also stores a transition demand message to be notified to the driver for demanding transition. The memory 62 also stores various application programs, such as a travel control program to execute therefor.

The processor 63, which is an example of a control unit, includes one or more processors and a peripheral circuit thereof. The processor 63 may further include another operating circuit, such as a logic-arithmetic unit, an arithmetic unit, or a graphics processing unit.

Figure 3:
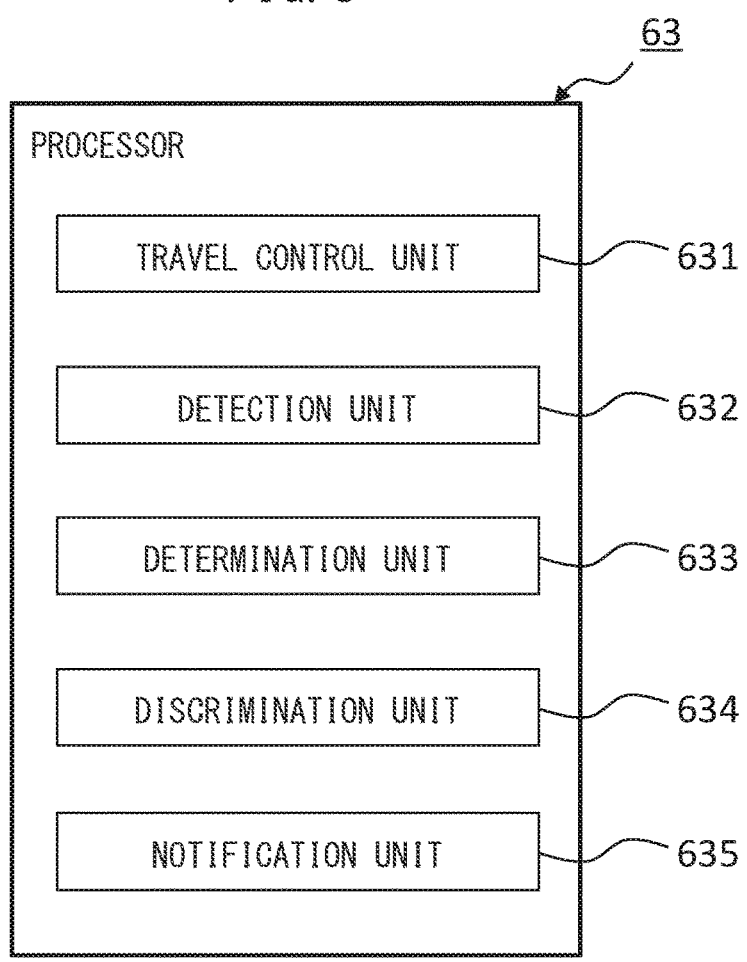
FIG. 3 is a functional block diagram of a processor included in the ECU.

FIG. 3 is a functional block diagram of the processor 63 included in the ECU 6.

As its functional blocks, the processor 63 of the ECU 6 includes a travel control unit 631, a detection unit 632, a determination unit 633, a discrimination unit 634, and a notification unit 635. These units included in the processor 63 are functional modules implemented by a computer program stored in the memory 62 and executed on the processor 63. The computer program for achieving the functions of the units of the processor 63 may be provided in a form recorded on a computer-readable and portable medium, such as a semiconductor memory, a magnetic recording medium, or an optical recording medium. Alternatively, the units included in the processor 63 may be implemented in the ECU 6 as separate integrated circuits, microprocessors, or firmware.

The travel control unit 631 autonomously controls at least one of the acceleration, deceleration, and steering of the vehicle traveling on the road.

The travel control unit 631 acquires from the storage device 5 map information representing the lanes and other terrain around the current position of the vehicle 1 identified by the positioning signal received from the GNSS receiver 4. The travel control unit 631 also inputs the surrounding images generated by the surrounding camera 2 mounted on the vehicle 1 into a classifier that has been trained in advance to detect vehicles and other moving objects from the images to thereby detect moving objects located in the surroundings of the vehicle 1. The classifier outputs confidence rates for a region of a surrounding image respectively indicating a certainty of classification into a class of object among classes of object covered by detection. The classifier detects an object of that class in a region with a confidence rate higher than a predetermined threshold value.

The classifier may be, for example, a convolutional neural network (CNN) including a plurality of convolution layers connected in series from the input toward the output. A CNN that has been trained in accordance with a predetermined training technique such as backpropagation, using a plurality of images including vehicles and other moving objects as training data operates as a classifier to detect moving objects from surrounding images.

The classifier may also be a CNN trained to detect features such as lane lines, road signs, and road markings in addition to moving objects from surrounding images. The travel control unit 631 inputs surrounding images to such a classifier to detect moving objects and features located in the surroundings of the vehicle 1.

The travel control unit 631 tracks a moving object in a predetermined period in the past and estimates a future position of the moving object. The travel control unit 631 generates a travel route along a lane represented in the terrain of the surroundings of the vehicle 1 so that the distance to an estimated future position of a moving object in the surroundings of the vehicle 1 not to fall below a certain level. The travel control unit 631 also outputs control signals to a traveling mechanism (not shown) of the vehicle 1 so that the vehicle 1 travels along the travel route. The traveling mechanism includes, for example, an engine or motor for accelerating the vehicle 1, a brake for decelerating the vehicle 1, and a steering mechanism for steering the vehicle 1.

The detection unit 632 detects two-wheelers, including bicycles, located in the surroundings of the vehicle 1 traveling under autonomous control from the surrounding images generated by the surrounding camera 2.

The detection unit 632 detects two-wheelers located in the surroundings of the vehicle 1 by inputting the surrounding images to a classifier that has been trained in advance to detect two-wheelers. The classifier may be, for example, a CNN trained in advance to detect two-wheelers from input images. The detection of moving objects by the travel control unit 631 and the detection of two-wheelers by the detection unit 632 may be parallelly executed by using a CNN trained to detect moving objects, which include two-wheelers, from input images as the classifier.

The determination unit 633 determines whether a target road on which the vehicle 1 was traveling when a surrounding image in which a two-wheeler was detected was generated is a shared road on which bicycle travel is permitted.

The determination unit 633 acquires the traffic regulations information applied to the target road including the current position of the vehicle 1 identified by the positioning signal received from the GNSS receiver 4 from the storage device 5 storing the map data. The determination unit 633 determines whether the target road is a shared road based on the acquired traffic regulations information.

The determination unit 633 may also determine whether the target road is a shared road based on features detected from a surrounding image. For example, when a road sign or road marking representing a bicycle lane is detected from a surrounding image, the determination unit 633 may determine that the target road is a shared road.

The discrimination unit 634 discriminates whether the two-wheeler detected from the surrounding image is a bicycle.

The discrimination unit 634, for example, compares the confidence rate outputted from the classifier when a two-wheeler was detected from the surrounding image with a confidence rate threshold stored in advance in the memory 62. The discrimination unit 634 discriminates the detected two-wheeler as a bicycle when the confidence rate is larger than the confidence rate threshold and discriminates the detected two-wheeler as not a bicycle when the confidence rate is not larger than the confidence rate threshold.

The notification unit 635 notifies the driver the transition demand when it is determined that the target road is a shared road. The notification unit 635 does not notify the driver of the transition demand when it is determined that the target road is a shared road.

The notification unit 635 notifies the driver of the vehicle 1 of the transition demand by, for example, displaying a transition demand image stored in the memory 62 as a transition demand message on the meter display 3. The transition demand image includes the text such as "Autonomous driving control will end. Please operate manually." The transition demand image may also be an image demanding the driver to take action requested from the driver of the vehicle 1 for transition (for example, gripping the steering wheel). Further, the notification unit 635 may notify the driver of the transition demand by playing back a transition demand voice stored in the memory 62 by a speaker device as a transition demand message. Still further, the notification unit 635 may notify the driver of the transition demand by vibrating a seat vibrator in a transition demand vibrating pattern stored in the memory 62.

When it is discriminated by the discrimination unit 634 that the two-wheeler detected from the surrounding image is not a bicycle, the notification unit 635 need not notify the driver of the transition demand, even if it is determined that the target road is a shared road. The ECU 6 performing in this way can suitably handle transition from autonomous driving control to manual driving control when a two-wheeler is detected in the surroundings of the vehicle.

When suppression of transition demand in accordance with the result of discrimination by the discrimination unit 634 is not required, the ECU 6 need not include the discrimination unit 634.

Figure 4:
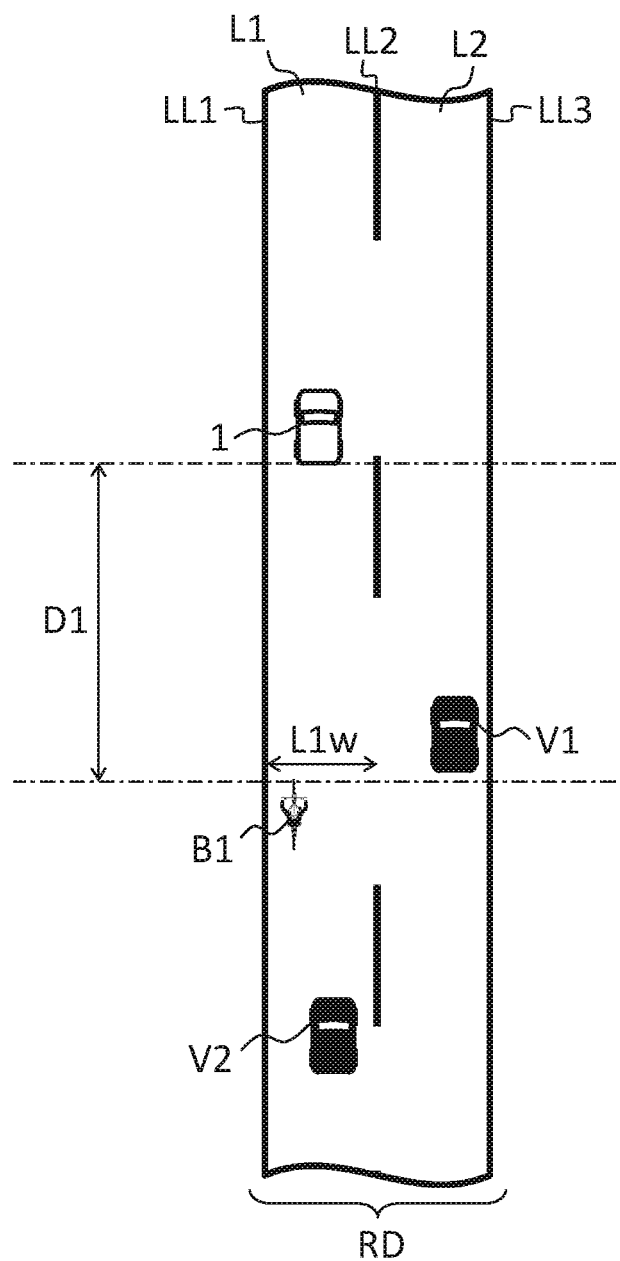
FIG. 4 schematically illustrates an example of surroundings of a vehicle.

FIG. 4 schematically illustrates an example of the surroundings of a vehicle.

In the example of the surroundings of a vehicle, the vehicle 1 is traveling on a lane L1 under autonomous control at a road RD having a lane L1 demarcated by lane lines LL1, LL2 and a lane L2 demarcated by lane lines LL2, LL3. The width of the lane L1 is L1$w$. On the lane L1, behind the vehicle 1, in the increasing order of the distance from the vehicle 1, a two-wheeler B1 and surrounding vehicle V2 are traveling. The distance from the vehicle 1 to the two-wheeler B1 is D1. On the lane L2, behind the vehicle 1, a surrounding vehicle V1 is traveling.

Figure 5:
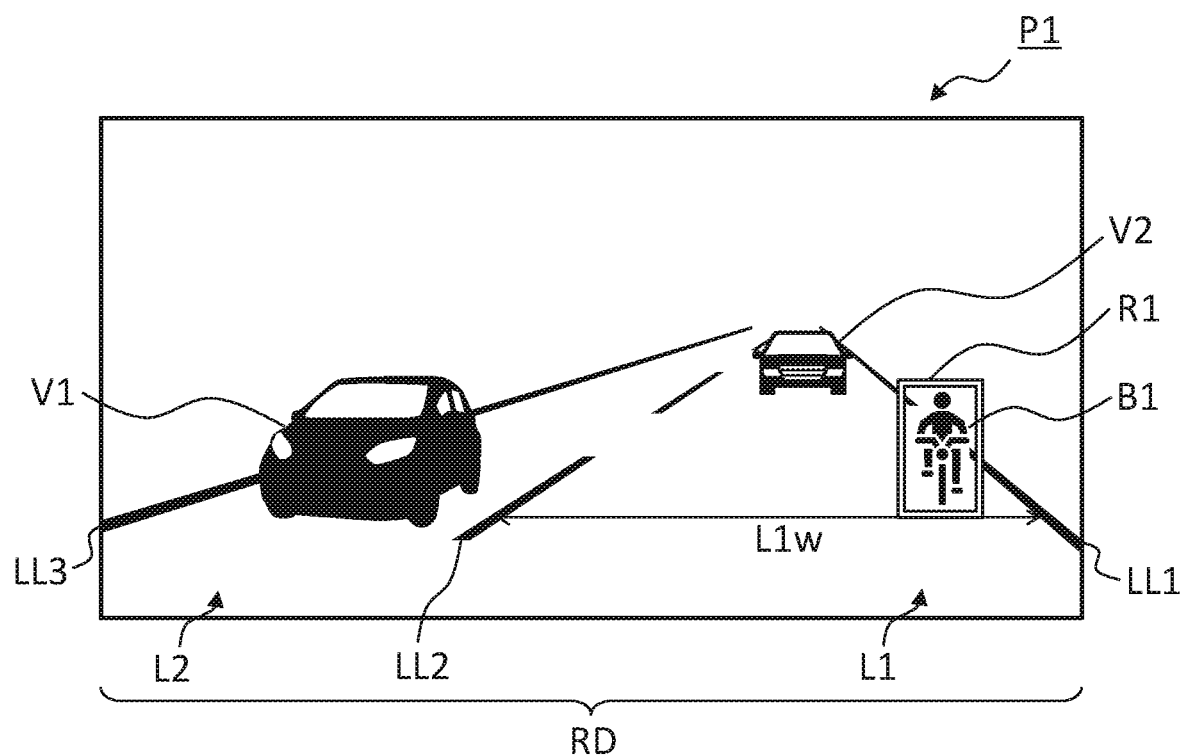
FIG. 5 schematically illustrates an example of a generated surrounding image.

FIG. 5 schematically illustrates an example of a generated surrounding image.

In the example of the surroundings of the vehicle, the back surrounding camera 2-2 of the vehicle 1 generates a surrounding image P1 representing the situation at the back of the vehicle 1.

The detection unit 632 detects the two-wheeler B1, surrounding vehicles V1 and V2, and lane lines LL1 to 3 by inputting the surrounding image P1 to the classifier. At the surrounding image P1 in FIG. 5, the region R1 corresponding to the two-wheeler B1 is shown by a double line.

The detection unit 632 detects a two-wheeler B1 located in the surroundings of the vehicle 1 from a surrounding image P1 generated in accordance with the example state of the surroundings of the vehicle. When it is determined by the determination unit 633 that the road RD is a shared road, the notification unit 635 notifies the driver of a transition demand.

FIG. 6 is a flowchart of travel control processing. The ECU 6 repeatedly performs the processing shown in FIG. 6 at predetermined time intervals (for example, 1 second intervals) while the vehicle 1 is traveling under autonomous control by the travel control unit 631.

First, the detection unit 632 of the processor 63 of the ECU 6 detects a two-wheeler, which may be a bicycle, located in the surroundings of the vehicle 1 from a surrounding image representing the surroundings of the vehicle 1 generated by the surrounding camera 2 (step S1).

Next, the detection unit 632 determines whether a two-wheeler was detected from the surrounding image (step S2). When it is determined that a two-wheeler was not detected from the surrounding image (step S2: N), the detection unit 632 terminates the travel control processing. In this case, the ECU 6 continues the autonomous control of travel of the vehicle by the travel control unit 631.

When a two-wheeler is detected from the surrounding image (step S2: Y), the determination unit 633 of the processor 63 of the ECU 6 determines whether the target road on which the vehicle 1 was traveling when the surrounding image in which the two-wheeler was detected was generated is a shared road (step S3). When it is determined that the target road is not a shared road (step S3: N), the determination unit 633 terminates the travel control processing. In this case, ECU 6 continues the autonomous control of travel of the vehicle by the travel control unit 631.

When it is determined that the target road is a shared road (step S3: Y), the notification unit 635 notifies the driver of the transition demand (step S4) and terminates the travel control processing. In this case, the ECU 6 performs control in accordance with an action of the driver with respect to the transition demand, such as, transitioning from autonomous control to manual control of travel and securing safety by stopping the vehicle.

The ECU 6 can suitably change the travel of a vehicle from autonomous driving control to manual driving control when a two-wheeler is detected in the surroundings of the vehicle.

According to a modification, the notification unit 635 does not notify a driver of a transition demand even if a two-wheeler located in the surroundings of the vehicle 1 is detected from a surrounding image and it is determined that the target road is a shared road, when the two-wheeler is located at the back of the vehicle 1 and the distance from the vehicle 1 to this two-wheeler increases along with the elapse of time. Even if the two-wheeler located at the back were a bicycle, when the distance from the vehicle 1 to this two-wheeler increases along with the elapse of time, it is considered that this two-wheeler would not have any significant effect on travel of the vehicle 1. The ECU 6 performing in this way can suppress notification of transition demands with small needs and more suitably control travel of the vehicle.

The notification unit 635 can determine that a two-wheeler located behind the vehicle 1 was detected from a surrounding image when a two-wheeler is detected from a back surrounding image representing the surroundings in back of the vehicle 1 generated by, for example, the back surrounding camera 2-2.

Again referring to FIG. 5, the notification unit 635 first identifies the width L1$w$ of the lane L1 shown at the position of the bottom side of the region R1 in the surrounding image P1. When, at the surrounding image P1, the intersection of the lane lines L11 and L12 demarcated by the lane L1 and the extended line of the bottom side of the region R1 is hidden by the surrounding vehicles etc., the notification unit 635 may find the intersection of lane line model generated by using the lane lines LL1 and LL2 without the hidden parts and the extended line of the bottom side of the region R1, and identify the width L1$w$ of the lane L1 based on the position of the intersection. The notification unit 635 can estimate the distance from the surrounding camera 2 of the vehicle 1 to the position of the bottom side of the region R1 by using the width of the lane L1 included in the map data stored in the storage device 5, the width L1$w$ of the lane L1 shown in the surrounding image P1, and the focal distance of the optical system of the surrounding camera 2 stored in the memory 62.

The notification unit 635 can determine if the distance is increasing along with the elapse of time by comparing the distances to a two-wheeler detected from surrounding images generated at different points of time.

The vehicle 1 may also have as a surrounding sensor a LiDAR (light detection and ranging) sensor or radar (radio detection and ranging) sensor. A LiDAR sensor or radar sensor outputs as surrounding data a range image whose pixels each has a value depending on the distance to an object represented in the pixel, based on the surrounding state of the vehicle 1.

It should be noted that those skilled in the art can apply various changes, substitutions, and modifications without departing from the spirit and scope of the present disclosure.

What is claimed is:

1. A travel controller of a vehicle that can travel on a road under autonomous driving control comprising a processor configured to:
    detect a two-wheeler, comprising a bicycle, located in surroundings of the vehicle from surrounding data representing the surroundings of the vehicle generated by a surrounding sensor mounted on the vehicle,
    input the surrounding data to a classifier that is trained to classify two-wheeled moving objects from surrounding data and output a confidence rate indicating a degree of certainty that a detected moving object is a bicycle,
    discriminate that the detected two-wheeler is a bicycle when the confidence rate output by the classifier is greater than a confidence rate threshold and not a bicycle when the confidence rate is not greater than the confidence rate threshold,
    determine whether a target road on which the vehicle was traveling is a shared road on which travel by bicycles is permitted when the two-wheeler is detected, when it is determined that the detected two-wheeler is a bicycle and the target road is a shared road, notify a driver of the vehicle of a transition demand demanding transition in control of the vehicle from autonomous driving control to manual driving control requiring driving operations by the driver and change the control of the vehicle from autonomous driving control to manual driving control, when it is determined that the detected two-wheeler is not a bicycle and the target road is a shared road, not notify the driver of the transition demand, and when it is determined that the target road is not a shared road, not notify the driver of the transition demand.

2. The travel controller according to claim 1, wherein the processor does not notify the driver of the transition demand when a when it is determined that the detected two-wheeler is a bicycle and the target road is a shared road and the detected two-wheeler is located behind the vehicle and a distance between the vehicle to the detected two-wheeler increases as time elapses.

3. A travel control method of a vehicle that can travel on a road under autonomous driving control, comprising:
    detecting a two-wheeler, comprising a bicycle, located in surroundings of the vehicle from surrounding data representing the surroundings of the vehicle generated by a surrounding sensor mounted on the vehicle,
    inputting the surrounding data to a classifier that is trained to classify two-wheeled moving objects from surrounding data and output a confidence rate indicating a degree of certainty that a detected moving object is a bicycle,
    discriminating that the detected two-wheeler is a bicycle when the confidence rate output by the classifier is greater than a confidence rate threshold and not a bicycle when the confidence rate is not greater than the confidence rate threshold,
    determining whether a target road on which the vehicle was traveling is a shared road on which travel by bicycles is permitted when the two-wheeler is detected,
    when it is determined that the detected two-wheeler is a bicycle and the target road is a shared road, notifying a driver of the vehicle of a transition demand demanding transition in control of the vehicle from autonomous driving control to manual driving control requiring driving operations by the driver and changing the control of the vehicle from autonomous driving control to manual driving control,
    when it is determined that the detected two-wheeler is not a bicycle and the target road is a shared road, not notifying the driver of the transition demand, and
    when it is determined the target road is not a shared road, not notifying the driver of the transition demand.

4. A non-transitory computer-readable medium having a computer program for travel control stored therein, the computer program causing a computer mounted on a vehicle that can travel on a road under autonomous driving control to execute a process comprising:
    detecting a two-wheeler, comprising a bicycle, located in surroundings of the vehicle from surrounding data representing the surroundings of the vehicle generated by a surrounding sensor mounted on the vehicle,
    inputting the surrounding data to a classifier that is trained to classify two-wheeled moving objects from surrounding data and output a confidence rate indicating a degree of certainty that a detected moving object is a bicycle,
    discriminating that the detected two-wheeler is a bicycle when the confidence rate output by the classifier is greater than a confidence rate threshold and not a bicycle when the confidence rate is not greater than the confidence rate threshold,
    determining whether a target road on which the vehicle was traveling is a shared road on which travel by bicycles is permitted when the two-wheeler is detected,
    when it is determined that the detected two-wheeler is a bicycle and the target road is a shared road, notifying a driver of the vehicle of a transition demand demanding transition in control of the vehicle from autonomous driving control to manual driving control requiring driving operations by the driver and changing the control of the vehicle from autonomous driving control to manual driving control,
    when it is determined that the detected two-wheeler is not a bicycle and the target road is a shared road, not notifying the driver of the transition demand, and
    when it is determined the target road is not a shared road, not notifying the driver of the transition demand.

\* \* \* \* \*